(12) United States Patent
Chung (10) Patent No.: US 11,789,329 B2
(45) Date of Patent: Oct. 17, 2023

(54) ELECTROCHROMIC DEVICE CAPABLE OF CREATING COLOR-CHANGING PATTERN

(71) Applicant: TINTABLE KIBING CO., LTD., Tainan City (TW)

(72) Inventor: Yi-Wen Chung, Tainan City (TW)

(73) Assignee: Redoxlens Co., Ltd., Tainan City (TW)

( * ) Notice: Subject to any disclaimer, the term of this patent is extended or adjusted under 35 U.S.C. 154(b) by 184 days.

(21) Appl. No.: 17/491,723

(22) Filed: Oct. 1, 2021

(65) Prior Publication Data

US 2023/0116462 A1 Apr. 13, 2023

(51) Int. Cl.
*G02F 1/157* (2006.01)
*G02B 5/08* (2006.01)
*G02F 1/1524* (2019.01)

(52) U.S. Cl.
CPC .............. *G02F 1/157* (2013.01); *G02B 5/0833* (2013.01); *G02F 1/1524* (2019.01)

(58) Field of Classification Search
CPC ....... G02B 5/0833; G02F 1/157; G02F 1/1524
See application file for complete search history.

(56) References Cited

U.S. PATENT DOCUMENTS

2001/0021066 A1* 9/2001 Tonar et al. ....... G02B 27/0006
359/604
2013/0094073 A1* 4/2013 Ushigome ............. G02F 1/157
359/275
2017/0102601 A1* 4/2017 Luten et al. ........... G02F 1/157

OTHER PUBLICATIONS

Ko et al. "An optically efficient full-color reflective display with an electrochromic device and color production units" Journal of Information Display, Vol. 20, No. 3, pp 155-160 (Year: 2019).*

* cited by examiner

*Primary Examiner* — George G. King
(74) *Attorney, Agent, or Firm* — Rosenberg, Klein & Lee (57) ABSTRACT

An electrochromic device composed of a pattern forming layer, an optical coating layer, an electrochromic component, and an opaque white layer arranged is revealed. The pattern forming layer has at least one pattern-shaded hollow hole for exposure of the optical coating layer. The optical coating layer which includes at least two layers of high and low refractive index material stacked alternately is the main layer to render colors. When transmittance of the electrochromic component which generates color changes is lower than 50%, a difference in the transmittance at 500 nm, 600 nm, and 700 nm is no more than 10%. Under such colored state, the color of light reflected by the optical coating layer is enhanced. The opaque white layer is for a sharper color contrast of the reflected light. Thereby light reflected by the optical coating layer show colors different from those of the electrochromic component in bleached and colored states.

12 Claims, 8 Drawing Sheets

ELECTROCHROMIC DEVICE CAPABLE OF CREATING COLOR-CHANGING PATTERN

BACKGROUND OF THE INVENTION

Field of the Invention

The present invention relates to an electrochromic device, especially to an electrochromic device capable of creating color-changing patterns in which different colors of reflected light are shown by arrangement of at least one pattern-shaded hollow hole for exposure of an optical coating layer while the electrochromic device is in a colored state and a bleached state. Thus the electrochromic device is applied to color changes on patterns displayed.

Description of Related Art

Color-changing material is a type of material which changes colors in response to various environmental factors such as light, temperature, electric field, etc. material changes color in response to various environmental clues, The color-changing material whose color is easily changed under various external stimuli is usually applied to various types of products including lenses, glass, rear-view mirrors, electronic paper, etc.

Among the above materials, the material that can change color in a reversible manner when an electric filed is applied is electrochromic material and parts made of electrochromic materials are called electrochromic components. The electrochromic component is placed in a colored state or a bleach state while being subjected to a voltage change to change colors of objects such as electrochromic lenses, smart glass, etc. Yet the coloration of the smart glass depends on materials for the electrochromic component used in the smart glass. The colors of the electrochromic component are fixed (unable to be changed) once it leaves the factory.

Since the colors of the electrochromic component in the colored state and the bleach state can only be modified by electrochromic materials used, the uses and applications of the electrochromic components are limited greatly. Thus there is room for improvement and there is a need to provide a novel electrochromic device.

SUMMARY OF THE INVENTION

Therefore, it is a primary objet of the present invention to provide an electrochromic device capable of creating color-changing patterns. Light reflected has different colors due to different designs of an optical coating layer when the electrochromic device is in a colored state or a bleached state. Thus the electrochromic device has more applications.

In order to achieve the above object, an electrochromic device capable of creating color-changing patterns according to the present invention includes a pattern forming layer, an optical coating layer, an electrochromic component, and an opaque white layer arranged in turn from top to bottom.

The pattern forming layer is provided with at least one pattern-shaded hollow hole which allows reflected light to pass through.

The optical coating layer is formed by at least two layers of high refractive index material and low refractive index material stacked alternately. An area of the optical coating layer corresponding to the pattern-shaped hollow hole of the pattern forming layer is exposed to reflect light.

The electrochromic component consists of a first substrate layer, a first transparent conducting layer, a first electrochromic layer, an electrolyte layer, a second electrochromic layer, a second transparent conducting layer, and a second substrate stacked in turn from top to bottom. When optical transmittance of the electrochromic component which generates color changes is lower than 50%, a difference in the optical transmittance at wavelengths of 500 nm, 600 nm, and 700 nm is no more than 10%.

The opaque white layer is to make colors of reflected light have a sharper color contrast.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content, purposes and functions of the present invention more clearly and completely, please refer to the following detailed descriptions, figures and reference signs.

Figure 1:
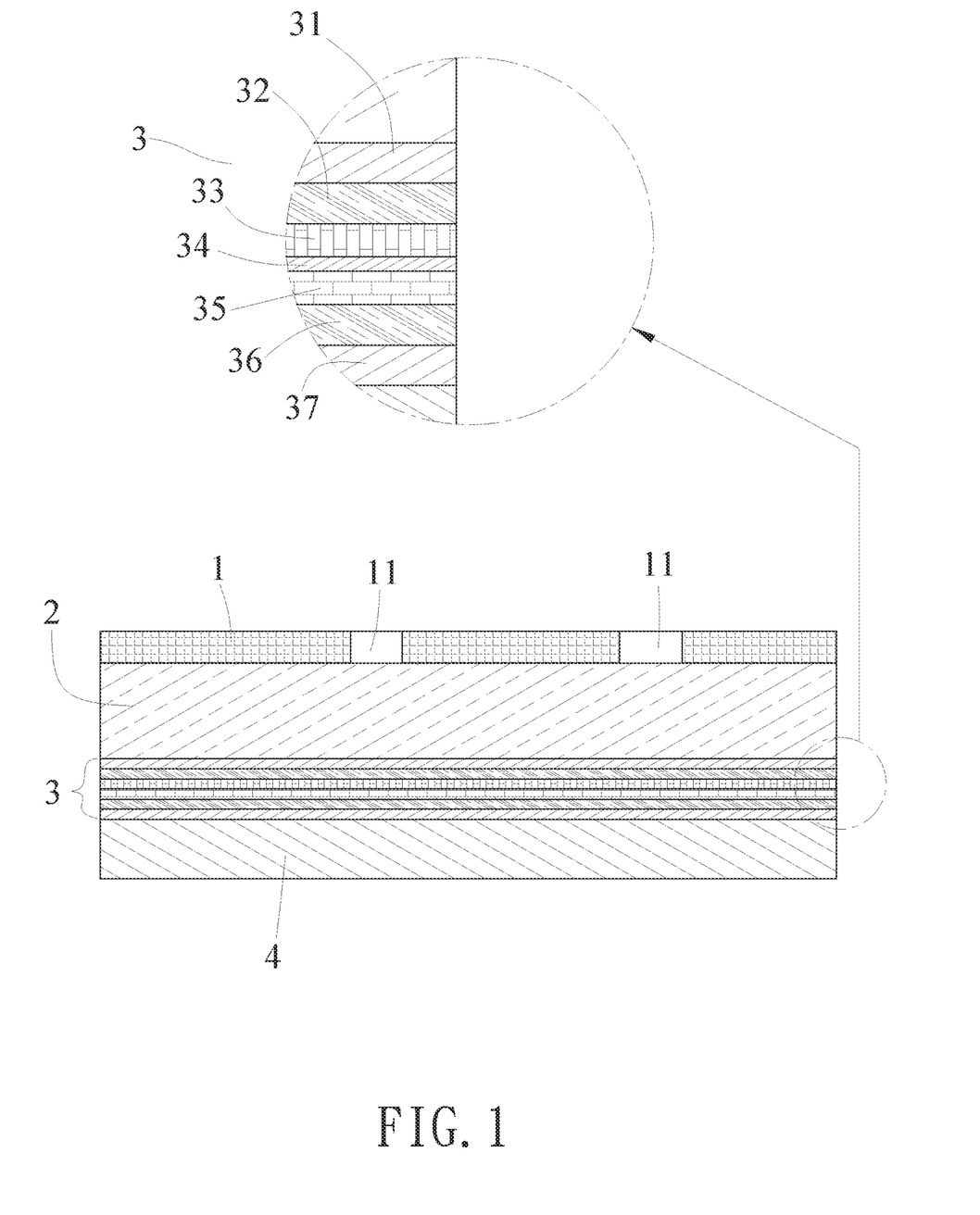
FIG. 1 is a schematic drawing showing structure of an embodiment according to the present invention.

Refer to FIG. 1 which shows structure of an embodiment of an electrochromic device capable of creating color-changing patterns is revealed. The electrochromic device of the present invention includes a pattern forming layer 1, an optical coating layer 2, an electrochromic component 3, and an opaque white layer 4, disposed in turn from top to bottom.

The pattern forming layer 1 which shields light and stops reflection of the light is provided with at least one pattern-shaded hollow hole 11 which is penetrating the pattern forming layer 1 and forming an area allowing reflected light to pass through.

The optical coating layer 2 is formed by at least two layers of high refractive index material and low refractive index material stacked alternately. An area of the optical coating layer 2 corresponding to the pattern-shaped hollow hole 11 of the pattern forming layer 1 is exposed and capable of reflecting light because that the optical coating layer 2 is arranged under the pattern forming layer 1. The optical coating layer 2 which reflects light to show colors through optical design is the main layer of the present device used to render desired colors. In a preferred embodiment, the high refractive index material is selected from titanium dioxide (TiO$_2$), trititanium pentoxide (Ti$_3$O$_5$), and niobium pentoxide (Nb$_2$O$_5$) while the low refractive index material is silicon dioxide (SiO$_2$). Moreover, the optical coating layer 2 is formed by a plurality of layers of high refractive index material and low refractive index material stacked alternately from bottom to top in turn. The wavelength of the visible light reflected by the optical coating layer 2 can be changed by the design of different total number of the layers of high and low refractive index material stacked alternately, or different thickness of the respective layers of high refractive index material and low refractive index material stacked alternately.

Figure 2:
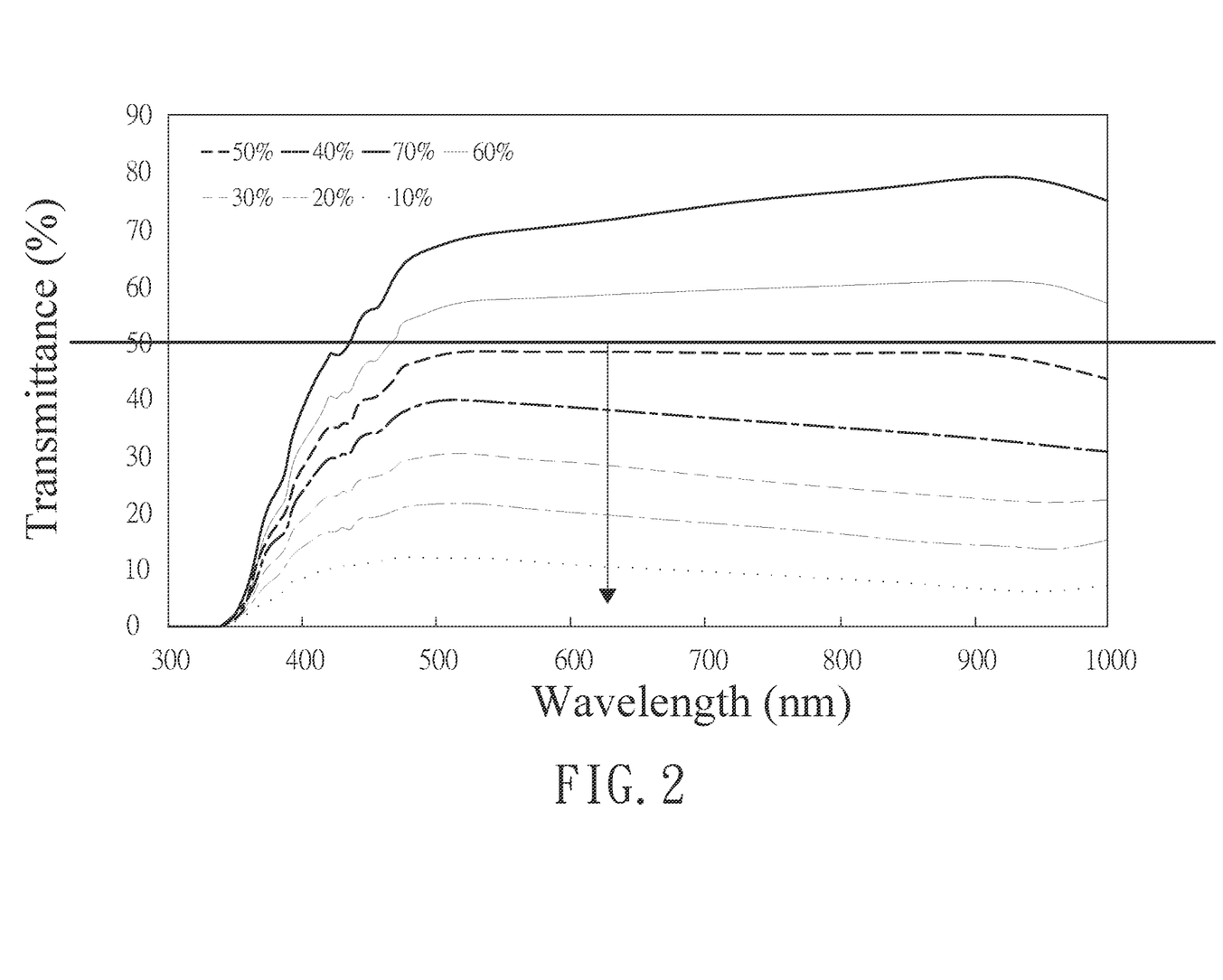
FIG. 2 shows different curves of percent transmittance of an embodiment while generating color changes according to the present invention.

The electrochromic component 3 consists of a first substrate layer 31, a first transparent conducting layer 32, a first electrochromic layer 33, an electrolyte layer 34, a second electrochromic layer 35, a second transparent conducting layer 36, and a second substrate 37 stacked in turn from top to bottom. When optical transmittance of the electrochromic component 3 which generates color changes is lower than 50%, a difference in the optical transmittance at wavelengths of 500 nm, 600 nm, and 700 nm is no more than 10% (as shown in FIG. 2). In the electrochromic component 3 under such colored state, the color of the light reflected by the optical coating layer 2 is enhanced. In a preferred embodiment, the first electrochromic layer 33 and the second electrochromic layer 35 are made of tungsten oxide film and nickel oxide film respectively. A thickness of the tungsten oxide film, the nickel oxide film and the electrolyte layer 34 is 300 nm-1200 nm, 300 nm-1200 nm, and 80 μm-350 μm respectively.

The opaque white layer 4 is used to make the color of the reflected light have a sharper color contrast.

While being applied with a voltage, the electrochromic component 3 has a colored state and a bleached state which are in different colors due to different materials for the first electrochromic layer 33 and the second electrochromic layer 35. In a preferred embodiment, the first electrochromic layer 33 and the second electrochromic layer 35 are made of the tungsten oxide film and the nickel oxide film respectively so that colors of the electrochromic component 3 in the colored state and the bleached state are deep green and pale yellow respectively. In combination with the reflected light through the pattern-shaped hollow holes 11 of the pattern forming layer 1 with different wavelengths, colors shown at the pattern-shaped hollow holes 11 changes. That means the pattern-shaped hollow hole 11 shows one color when the electrochromic component 3 is in the colored state while the pattern-shaped hollow hole 11 produces another color when the electrochromic component 3 is in the bleached state. Therefore, the color shown at the pattern-shaped hollow holes 11 of the present electrochromic device is the color of the light reflected by the optical coating layer 2, instead of the color of the electrochromic component 3 in the colored state or the bleached state. The color of the electrochromic component 3 in the colored state or the bleached state is only used as a base color. The design of the present structure certainly changes the traditional concept that the color change is determined by the electrochromic component 3.

Since the color shown at the pattern-shaped hollow holes 11 of the present electrochromic device is the color of the light reflected by the optical coating layer 2, the wavelength of visible light reflected by the optical coating layer 2 can be changed by the design of different number of the stacked layers in the optical coating layer 2 or different thickness of the respective stacked layers in the optical coating layer 2. Therefore, the color shown at the pattern-shaped hollow holes 11 is further changed.

Figure 3:
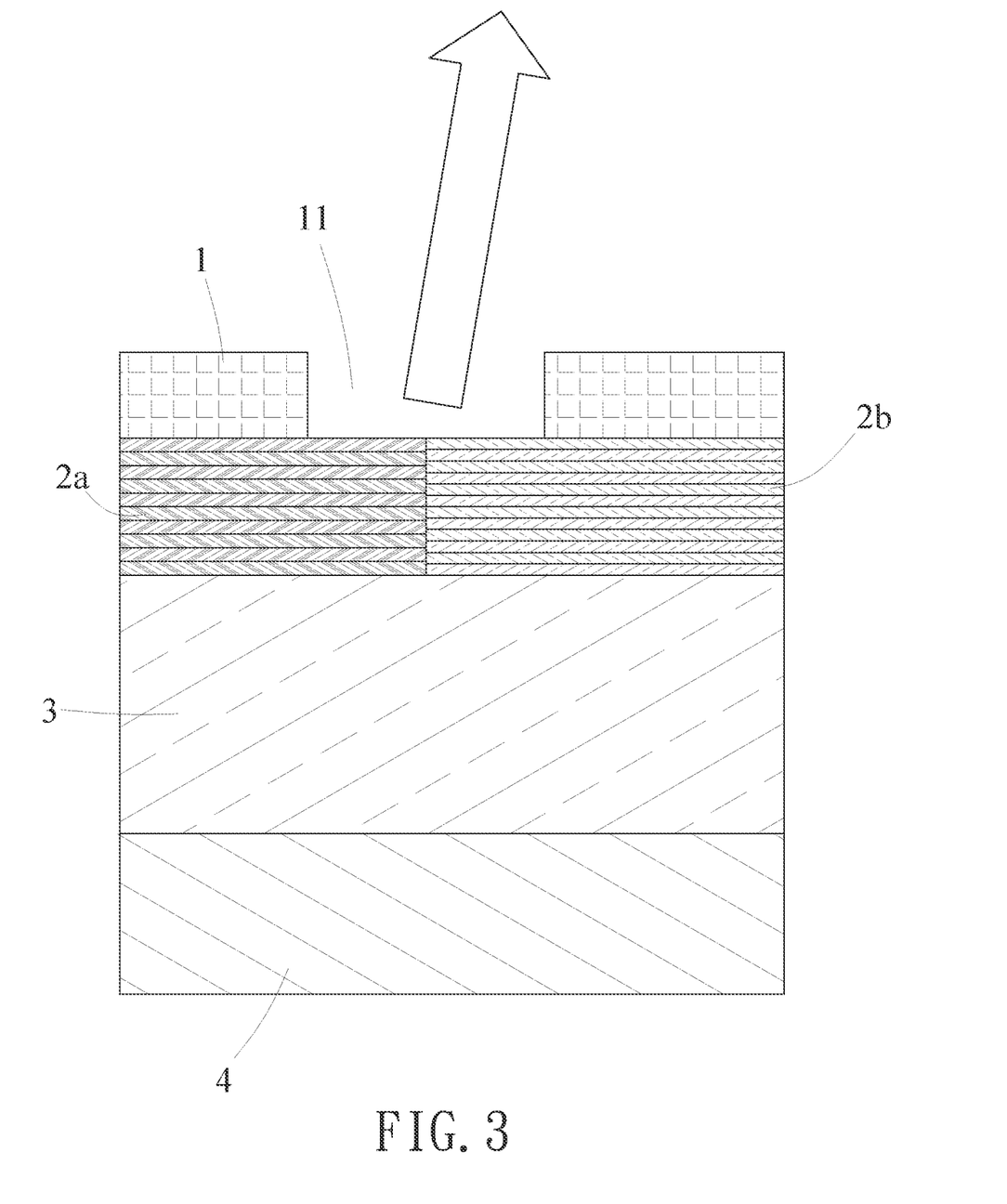
FIG. 3 is a schematic drawing showing structure of another embodiment according to the present invention.
Figure 4:
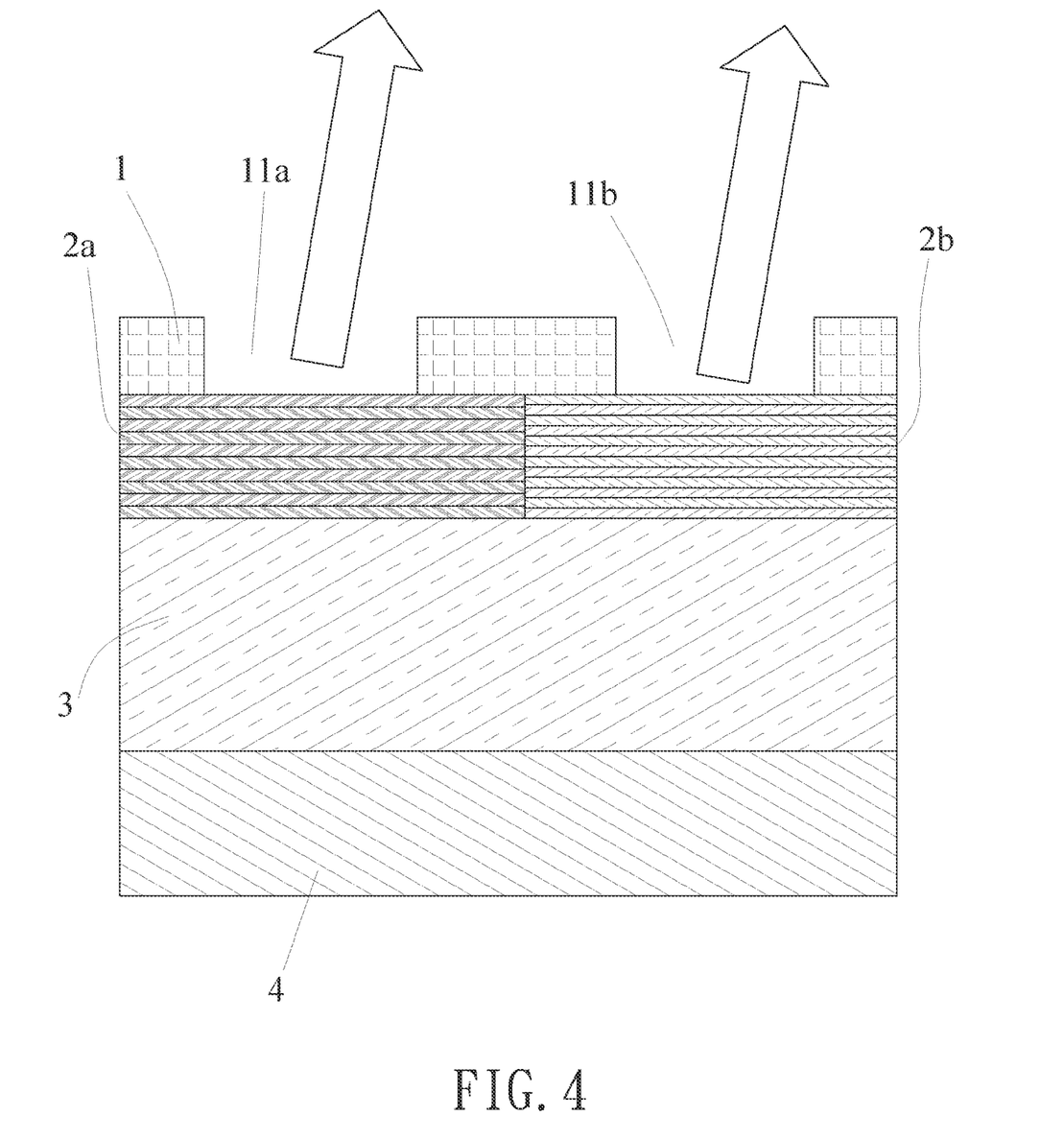
FIG. 4 is a schematic drawing showing structure of a further embodiment according to the present invention.

In a preferred embodiment, different optical coating layers 2 are disposed on different area between the pattern forming layer 1 and the electrochromic component 3. Refer to FIG. 3, a first and a second optical coating layers 2a, 2b with different numbers of stacked layers of high and low refractive index materials are arranged in area between the pattern forming layer 1 and the electrochromic component 3. For example, the first optical coating layer 2a and the second optical coating layer 2b have 10 and 12 stacked layers respectively. The first and the second optical coating layers 2a, 2b can be corresponding to either the same pattern-shaped hollow hole 11 or different pattern-shaped hollow holes 11 on the pattern forming layer 1. For instance, the first optical coating layer 2a and the second optical coating layer 2b are corresponding to a first pattern-shaped hollow hole 11a and a second pattern-shaped hollow hole 11b respectively. As shown in FIG. 3, when the first optical coating layer 2a is disposed corresponding to a part of area of the pattern-shaped hollow hole 11 and the second optical coating layer 2b is arranged disposed corresponding to the rest part of area of the pattern-shaped hollow hole 11, reflected light through the pattern-shaped hollow hole 11 has two different colors. As shown in FIG. 4, reflected light through the first pattern-shaped hollow hole 11a has the color corresponding to the first optical coating layer 2a and reflected light through the second pattern-shaped hollow hole 11b shows the color corresponding to the second optical coating layer 2b when the first and the second optical coating layers 2a, 2b are mounted corresponding to the first and the second pattern-shaped hollow holes 11a, 11b respectively. Thereby two different colors are shown at the first and the second pattern-shaped hollow holes 11a, 11b. Or the respective layers of high and low refractive index materials stacked alternately in the first and the second optical coating layers 2a, 2b have different thickness. Thus the first and the second optical coating layers 2a, 2b reflect light and create two different colors. By arrangement of the first and the second optical coating layers 2a, 2b at different area of the same pattern-shaped hollow hole 11, two kinds of light with different colors are shown at the same pattern-shaped hollow hole 11. Or pattern-shaped hollow holes 11 show different colors by disposition of the first and the second optical coating layers 2a, 2b on two different pattern-shaped hollow holes 11 correspondingly.

In order to learn technical features of the present invention, please refer to the following embodiments.

Embodiment 1

Figure 5:
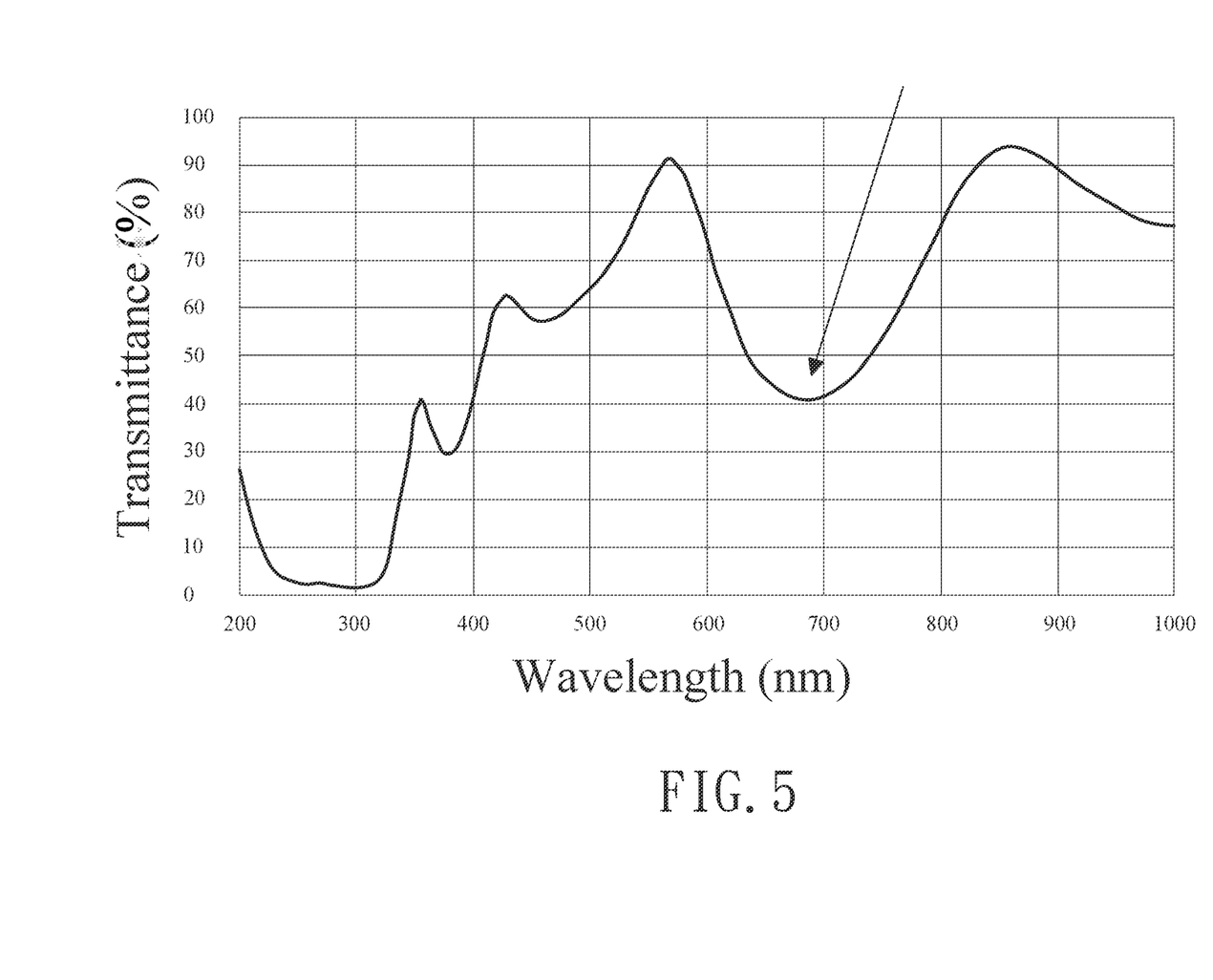
FIG. 5 is optical transmittance spectrum of an optical coating layer of embodiment 1 in a colored state according to the present invention.
Figure 6:
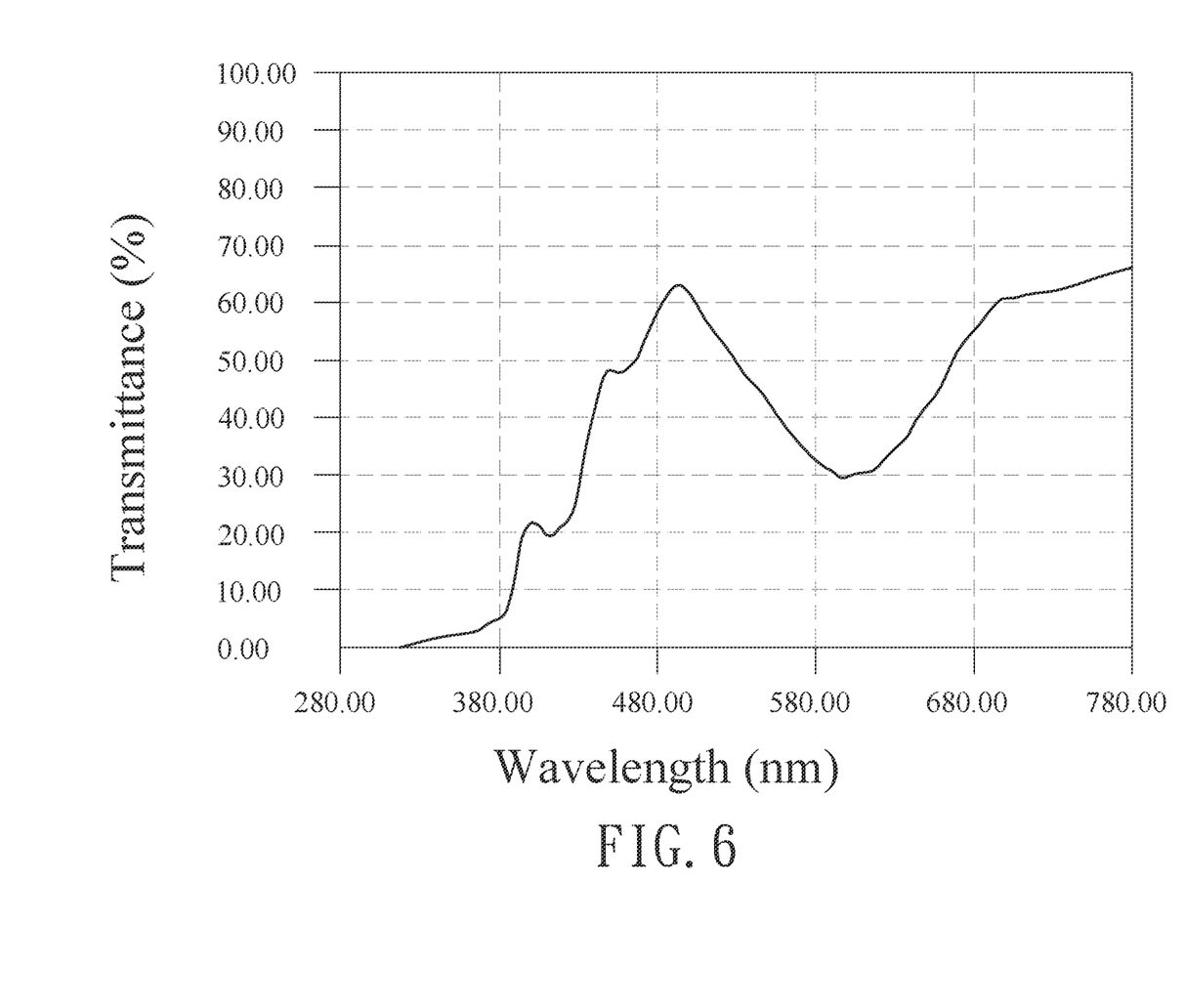
FIG. 6 is optical transmittance spectrum of an optical coating layer of embodiment 1 in a bleached state according to the present invention.

The order and thickness of the respective layers of high and low refractive index materials stacked alternately in the optical coating layer 2 are listed in Table 1. FIG. 5 shows optical transmittance spectrum of the optical coating layer 2 when the electrochromic component 3 is in the colored state and it's learned that the highest reflectance shows at the wavelength of about 680 nm. Combined with the reflectance of other wavelengths, light reflected by the optical coating layer 2 is purplish red so that the color shown at the pattern-shaped hollow hole 11 is purplish red. Refer to FIG. 6, optical transmittance spectrum of the optical coating layer 2 is revealed while the electrochromic component 3 is in the bleached state. The highest reflectance appears at the wavelength of about 600 nm. After being combined with the reflectance of other wavelengths, light reflected by the optical coating layer 2 is light green so that the color shown at the pattern-shaped hollow hole 11 is light green.

TABLE 1

| the number of layers | material | thickness (nm) |
|---|---|---|
| 1 | $Ti_3O_5$ | 10.74 |
| 2 | $SiO_2$ | 151.53 |
| 3 | $Ti_3O_5$ | 56.33 |
| 4 | $SiO_2$ | 124 |
| 5 | $Ti_3O_5$ | 114.46 |
| 6 | $SiO_2$ | 104.73 |
| 7 | $Ti_3O_5$ | 109.73 |
| 8 | $SiO_2$ | 182.29 |
| 9 | $Ti_3O_5$ | 15.45 |
| 10 | $SiO_2$ | 159.68 |

Embodiment 2

Figure 7:
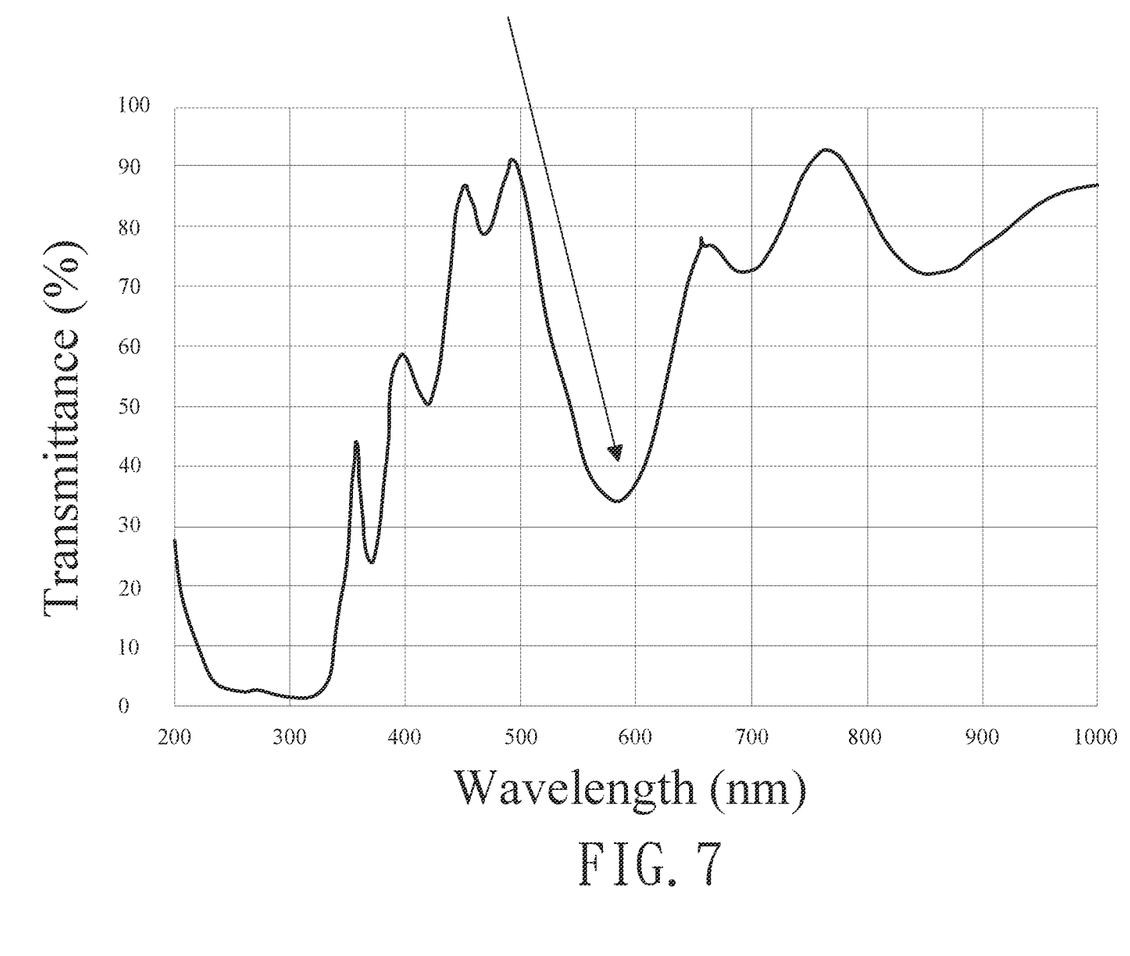
FIG. 7 is optical transmittance spectrum of an optical coating layer of embodiment 2 in a colored state according to the present invention.
Figure 8:
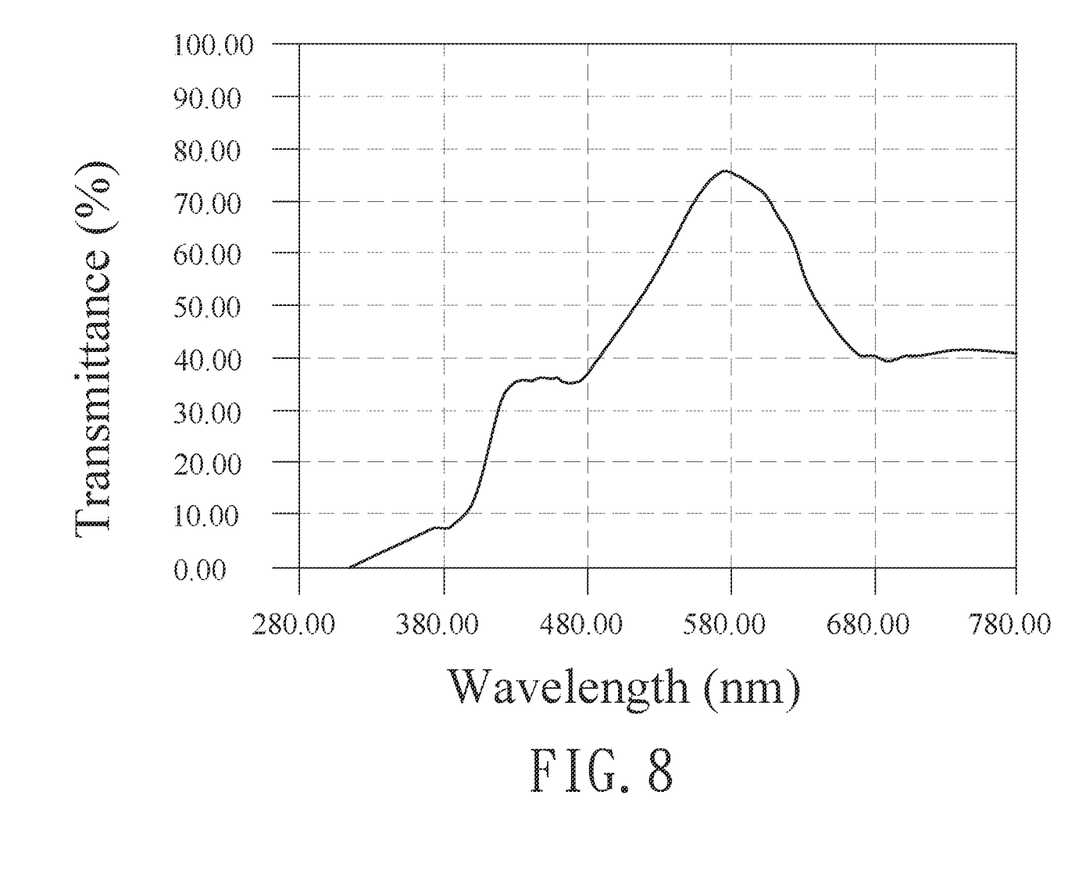
FIG. 8 is optical transmittance spectrum of an optical coating layer of embodiment 2 in a bleached state according to the present invention.

The order and thickness of the respective layers of high and low refractive index materials stacked alternately in the optical coating layer 2 are listed in Table 2. FIG. 7 shows optical transmittance spectrum of the optical coating layer 2 when the electrochromic component 3 is in the colored state and the highest reflectance shows at the wavelength of about 580 nm. Combined with the reflectance of other wavelengths, light reflected by the optical coating layer 2 is yellow-green and that means the color shown at the pattern-shaped hollow hole 11 is yellow-green. Refer to FIG. 8, optical transmittance spectrum of the optical coating layer 2 is revealed while the electrochromic component 3 is in the bleached state. After combination of the reflectance of the respective wavelengths, light reflected by the optical coating layer 2 is pale yellow. Thus the color shown at the pattern-shaped hollow hole 11 is pale yellow.

TABLE 2

| the number of layer | material | thickness (nm) |
|---|---|---|
| 1 | $Ti_3O_5$ | 10.02 |
| 2 | $SiO_2$ | 33.19 |
| 3 | $Ti_3O_5$ | 41.91 |
| 4 | $SiO_2$ | 169.28 |
| 5 | $Ti_3O_5$ | 15.9 |
| 6 | $SiO_2$ | 84.21 |
| 7 | $Ti_3O_5$ | 103.61 |
| 8 | $SiO_2$ | 236.2 |
| 9 | $Ti_3O_5$ | 86.76 |
| 10 | $SiO_2$ | 187 |
| 11 | $Ti_3O_5$ | 20.72 |
| 12 | $SiO_2$ | 112.54 |

Thereby the color shown at the pattern-shaped hollow hole 11 is the color of the light reflected by the optical coating layer 2, instead of the color of the electrochromic component 3 in the colored or bleached state. By changes in the number of the alternately stacked layers and the thickness of the respective layer of the optical coating layer 2, and parallel arrangement of a plurality of optical coating layers 2, different colors are shown at the pattern-shaped hollow hole 11. Therefore, the electrochromic device has more applications.

In addition, the present electrochromic device can be applied to various products such as mobile phone cases, glasses frames, vehicle bodies, hats, bags, electrical appliances, etc.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An electrochromic device capable of creating color-changing patterns comprising:
a pattern forming layer is provided with at least one pattern-shaped hollow hole which allows reflected light to pass through; an optical coating layer which is formed by at least two layers of high refractive index material and low refractive index material stacked alternately;
an area of the optical coating layer corresponding to the pattern-shaped hollow hole of the pattern forming layer is exposed to reflect light;
an electrochromic component which includes a first substrate layer, a first transparent conducting layer, a first electrochromic layer, an electrolyte layer, a second electrochromic layer, a second transparent conducting layer, and a second substrate stacked in turn from top to bottom; a difference in optical transmittance at wavelengths of 500 nm, 600 nm, and 700 nm is no more than 10% when the optical transmittance of the electrochromic component which generates color changes is lower than 50%; and
an opaque white layer which is used to make colors of the light reflected have a sharper color contrast; the pattern forming layer, the optical coating layer, the electrochromic component, and the opaque white layer are arranged in turn from top to bottom, and
wherein the optical coating layer includes a first optical coating layer and a second optical coating layer arranged side-by-side; the first optical coating layer is formed by the layers of the high refractive index material and the low refractive index material stacked alternately in turn from bottom to top; the second optical coating layer is formed by the layers of the high refractive index material and the low refractive index material stacked alternately in turn from bottom to top; total numbers of the layers of the high refractive index material and the low refractive index material stacked alternately of the first optical coating layer and the second optical coating layer are different; the first optical coating layer in combination with the second optical coating layer is corresponding to at least one of the pattern-shaped hollow holes; or the first optical coating layer and the second optical coating layer are respectively corresponding to at least one of the pattern-shaped hollow holes.

2. The electrochromic device capable of creating color-changing patterns as claimed in claim 1, wherein the first electrochromic layer and the second electrochromic layer are made of tungsten oxide film and nickel oxide film respectively.

3. The electrochromic device capable of creating color-changing patterns as claimed in claim 2, wherein a thickness of both the tungsten oxide film and the nickel oxide film is 300 nm-1200 nm.

4. The electrochromic device capable of creating color-changing patterns as claimed in claim 3, wherein a thickness of the electrolyte layer is 80 µm-350 µm.

5. The electrochromic device capable of creating color-changing patterns as claimed in claim 4, wherein the high refractive index material is selected from the group consisting of titanium dioxide ($TiO_2$), trititanium pentoxide ($Ti_3O_5$), and niobium pentoxide ($Nb_2O_5$).

6. The electrochromic device capable of creating color-changing patterns as claimed in claim 5, wherein the low refractive index material is silicon dioxide ($SiO_2$).

7. An electrochromic device capable of creating color-changing patterns comprising:
   a pattern forming layer is provided with at least one pattern-shaded hollow hole which allows reflected light to pass through; an optical coating layer which is formed by at least two layers of high refractive index material and low refractive index material stacked alternately;
   an area of the optical coating layer corresponding to the pattern-shaped hollow hole of the pattern forming layer is exposed to reflect light;
   an electrochromic component which includes a first substrate layer, a first transparent conducting layer, a first electrochromic layer, an electrolyte layer, a second electrochromic layer, a second transparent conducting layer, and a second substrate stacked in turn from top to bottom; a difference in optical transmittance at wavelengths of 500 nm, 600 nm, and 700 nm is no more than 10% when the optical transmittance of the electrochromic component which generates color changes is lower than 50%; and
   an opaque white layer which is used to make colors of the light reflected have a sharper color contrast; the pattern forming layer, the optical coating layer, the electrochromic component, and the opaque white layer are arranged in turn from top to bottom, and
   wherein the optical coating layer includes a first optical coating layer and a second optical coating layer arranged side-by-side; the first optical coating layer is formed by the layers of the high refractive index material and the low refractive index material stacked alternately in turn from bottom to top; the second optical coating layer is formed by the layers of the high refractive index material and the low refractive index material stacked alternately in turn from bottom to top; a thickness of each of the layers of the high refractive index material and the low refractive index material stacked alternately of the first optical coating layer is different from a thickness of each of the layers of the high refractive index material and the low refractive index material stacked alternately of the second optical coating layer; the first optical coating layer in combination with the second optical coating layer is corresponding to at least one of the pattern-shaded hollow holes; or the first optical coating layer and the second optical coating layer are respectively corresponding to at least one of the pattern-shaded hollow holes.

8. The electrochromic device capable of creating color-changing patterns as claimed in claim 7, wherein the first electrochromic layer and the second electrochromic layer are made of tungsten oxide film and nickel oxide film respectively.

9. The electrochromic device capable of creating color-changing patterns as claimed in claim 8, wherein a thickness of both the tungsten oxide film and the nickel oxide film is 300 nm-1200 nm.

10. The electrochromic device capable of creating color-changing patterns as claimed in claim 9, wherein a thickness of the electrolyte layer is 80 μm-350 μm.

11. The electrochromic device capable of creating color-changing patterns as claimed in claim 10, wherein the high refractive index material is selected from the group consisting of titanium dioxide ($TiO_2$), trititanium pentoxide ($Ti_3O_5$), and niobium pentoxide ($Nb_2O_5$).

12. The electrochromic device capable of creating color-changing patterns as claimed in claim 11, wherein the low refractive index material is silicon dioxide ($SiO_2$).

* * * * *